United States Patent [19]

Lindenblatt et al.

[11] Patent Number: 5,174,351
[45] Date of Patent: Dec. 29, 1992

[54] ENDING APPARATUS AND METHOD

[75] Inventors: Bruno Lindenblatt; Gary Larsen, both of Prince George, Canada

[73] Assignee: Fabricating and Engineering (Prince George) Ltd., Prince George, Canada

[21] Appl. No.: 757,686

[22] Filed: Sep. 11, 1991

[51] Int. Cl.$^5$ ............................................. B27B 1/00
[52] U.S. Cl. ........................................ 144/356; 83/56; 83/276; 83/435; 83/597; 83/732; 144/242 R; 144/242 M; 144/379; 198/774.1; 414/746.4
[58] Field of Search .............. 144/379, 242 R, 242 M, 144/356, 357; 83/13, 56, 276, 425.2, 425.4, 435, 597, 732, 102; 414/746.4, 746.6, 746.8; 198/774.1, 774.2

[56] References Cited

U.S. PATENT DOCUMENTS

| | | | |
|---|---|---|---|
| 3,130,830 | 4/1964 | Allbeson | 198/774.1 |
| 3,812,951 | 5/1974 | Fullaway | 83/102 |
| 3,937,114 | 2/1976 | Joensson et al. | 144/379 |
| 4,585,114 | 4/1986 | Liliano | 198/774.2 |

Primary Examiner—W. Donald Bray
Attorney, Agent, or Firm—Beehler & Pavitt

[57] ABSTRACT

An ending apparatus for positioning elongate objects comprising, in combination, object singulating equipment for separating a plurality of elongate objects in an inlet area into single objects while moving the objects in a first direction to an outlet area, and object support rollers intermediate the inlet and outlet area for supporting a separated, single elongate object. The object support rollers are adapted to move the elongate object in a second direction toward a reference surface independently of the object's movement in the first direction on the singulating device. The reference surface stops movement of the elongate object to establish a predetermined position for the elongate object. Establishing the position of the object permits more efficient handling during further processing.

16 Claims, 2 Drawing Sheets

ENDING APPARATUS AND METHOD

FIELD OF THE INVENTION

This invention relates to an ending apparatus and method for positioning of an object with respect to a reference surface, and is particularly suited for separating and ending elongate objects such as logs.

BACKGROUND OF THE INVENTION

In sawmills, the handling and processing of logs in an efficient manner is of vital importance. Equipment for separating large groups of raw logs into individual logs is often the first stop in processing. The separated logs are then transported to an ending apparatus that positions each log relative to a reference surface so that the log is in a pre-determined position for future processing operations. This ending process is vital in such operations as cutting the log into pre-determined lengths. It is generally necessary to separate groups of logs into single logs in order to accomplish the ending process accurately.

Currently, the separating and ending process is carried out by different machinery. For example, a separating or singulating device as disclosed in Canadian Patent 1,277,682 issued on Dec. 11, 1990 to Interlog AB is used to separate groups of logs into individual logs. Once separated, the logs are transported to a ending apparatus for positioning in a second totally separate operation.

In a sawmill, movement of raw materials between equipment takes time which affects the overall efficiency and throughput through the mill. As well, each additional piece of equipment represents a significant capital expense.

Therefore, there is a general need for equipment that will reduce overall processing time by handling logs more efficiently and reducing the need for expensive equipment.

SUMMARY OF THE INVENTION

The present invention provides an ending apparatus that separates logs and performs an ending operation. Combining these two functions in a single apparatus eliminates the need for separate, expensive singulating equipment and ending equipment. Processing time is also reduced as the transportation period between equipment is eliminated.

Accordingly, the present invention provides an ending apparatus for positioning elongate objects comprising, in combination:

object singulating means for separating a plurality of elongate objects in an inlet area into single objects while moving the objects in a first direction to an outlet area; and object support means intermediate said inlet and outlet area for supporting a separated, single elongate object adapted to move said elongate object in a second direction toward reference surface means independently of the object's movement in said first direction on said singulating device;

said reference surface means stopping movement of said elongate object to establish a pre-determined position for said elongate object.

The apparatus of the present invention provides a relatively compact piece of equipment that saves space within a sawmill. In addition, the compact nature of the present apparatus allows for adjacent positioning of a close-coupled breakdown or handling device such as a cutting machine for cutting the logs into pre-determined lengths.

In a further aspect, the present invention provides a method for positioning a plurality of elongate objects comprising the steps of:

moving the objects in a first direction between an inlet area and an outlet area;

separating the elongate objects into discrete objects while moving the objects in said first direction; and aligning each individual elongate object with respect to a pre-determined reference position by movement in a second direction independent of movement in said first direction.

BRIEF DESCRIPTION OF THE DRAWINGS

Aspects of the present invention are illustrated, merely by way of example, in the accompanying drawings in which.

DESCRIPTION OF THE PREFERRED EMBODIMENTS

Figure 1:
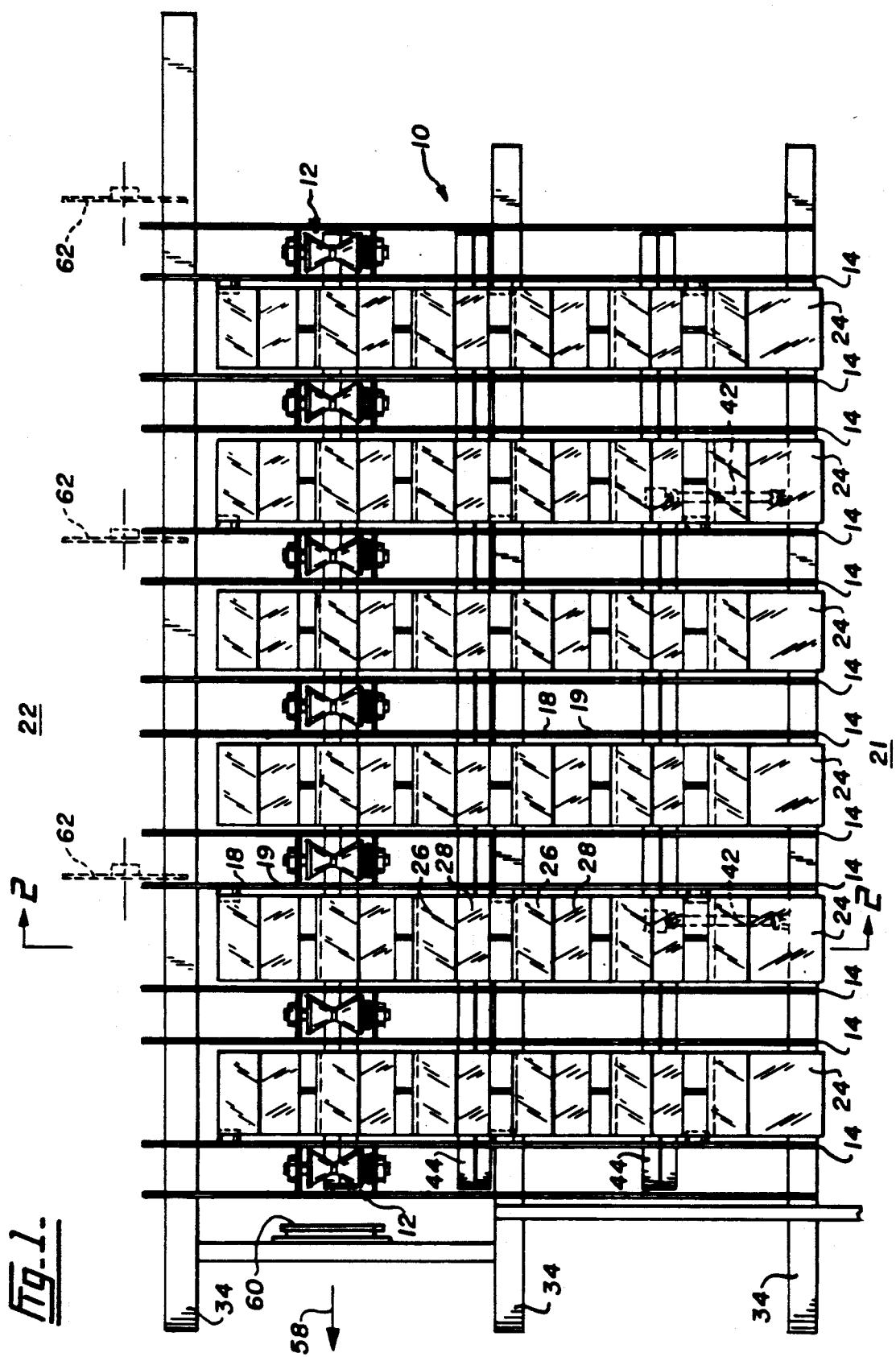
FIG. 1 is a plan view of an ending apparatus according to the present invention.

Referring to FIG. 1, a preferred embodiment of the present invention is illustrated in plan view. The device comprises, in combination, object singulating means in the form of singulating device 10 and object support means in the form of a plurality of rollers 12. In the following description, logs will be used as examples of articles to be processed, it being understood that the apparatus of the present invention is capable of handling any elongate object.

Figure 2:
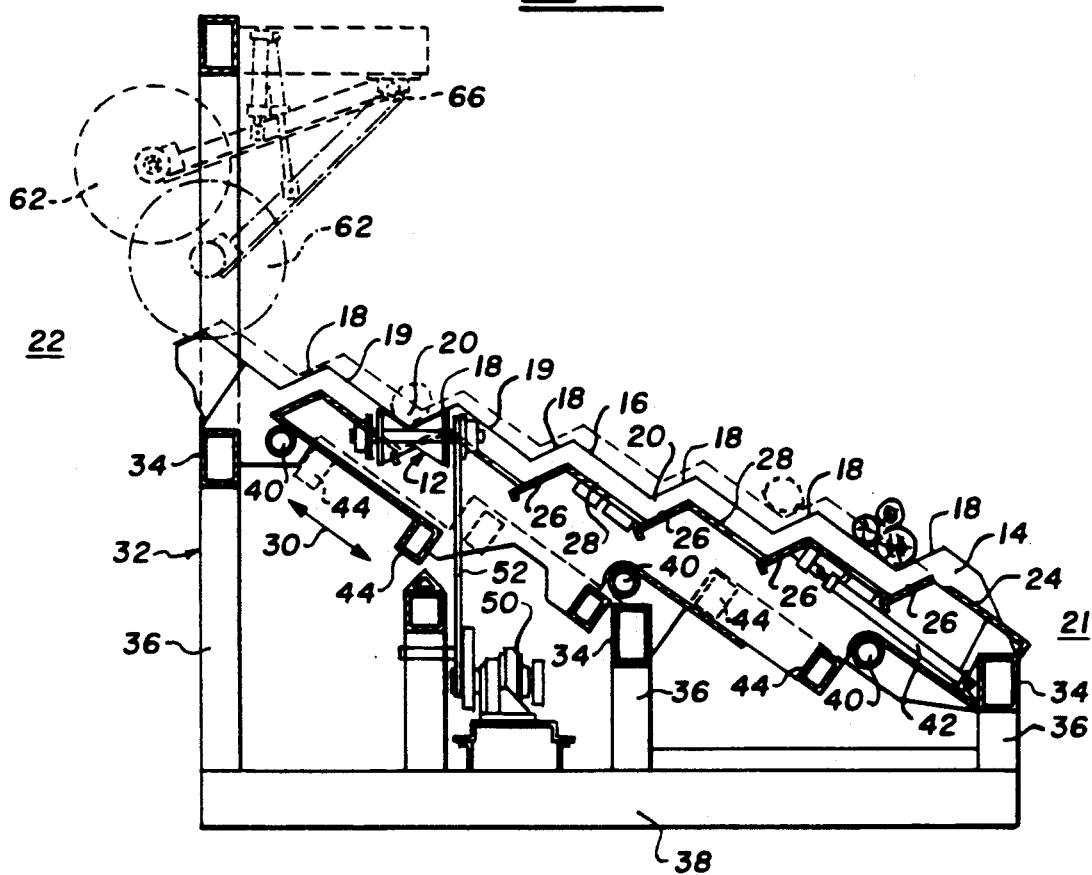
FIG. 2 is an elevation view with cut away section taken along line 2—2 of FIG. 1.

Singulating device 10 is preferably of the construction described in Canadian Patent 1,277,682 issued Dec. 11, 1990 to Interlog AB. The device comprises a series of pairs of spaced, parallel log support surfaces 14. As best shown in FIG. 2, each log support surface 14 comprises an essentially rigid plate member having an upper surface 16 formed into a series of steps 18 separated by inclined portions 19 which are generally parallel to each other. Steps 18 and their adjacent inclined portions 19 define a series of V-shaped pockets 20 along support surface 14 adapted to retain individual logs. Log support surfaces 14 extend generally between a log inlet area 21 and a log outlet area 22. Inlet area 21 retains a plurality of logs arranged in generally parallel fashion in a stack. Outlet area 22 can be provided with a conveyor belt (not shown) for removing logs after handling by the apparatus of the present invention.

Between pairs of fixed log support surfaces 14 are provided movable feeding surfaces 24 that are also formed into a step pattern that generally corresponds to the step pattern of the log support surface 14. The steps 26 of feeding surface 24 are separated by essentially parallel planar sections 28. The overall length of each feeding surface 24 is shorter than the length of the log support surfaces 14 to allow for back and forth motion of the feeding surface between pairs of log support surfaces in a first direction as indicated by arrow 30. The motion is such that steps 18 and 26 remain parallel and inclined portions 19 remain parallel with planar sections 28.

Feeding surface 24 are mounted to a support framework 32 to allow for the necessary back and forth motion. Referring to FIG. 2, log support surfaces 14 are rigidly mounted to a series of horizontal beams 34 that are in turn connected to uprights 36 extending from a base frame 38. Each log support surface 14 includes wheeled supports 40 that engage and support the underside of feeding surface 24. Feeding surfaces 24 are moved back and forth by driving means in the form of hydraulic cylinder 42 mounted between upright 36 adjacent the inlet area 21 and the underside of a step 26. By retracting and extending cylinder 42, the feeding surface 24 is movable between a lower position illustrated by solid lines and an upper position illustrated by dashed lines in FIG. 2. Note that the various feeding surfaces 24 are joined by connecting members 44 so that a single hydraulic cylinder 44 can drive a plurality of feeding surfaces.

Movement of feeding surfaces 24 between log support surfaces 14 causes individual logs to be driven up the inclined portions 19 of the log support surfaces. As feeding surfaces 24 are advanced upwardly, each step 26 in combination with inclined portion 19 of the log support surface forms a movable pocket that advances a single log held within the pocket up the apparatus along inclined portion 19. When step 26 of the feeding surface reaches the next log support surface step 18, the log rolls down step 18 and into stationary pocket 20 of the log support surface due to gravity. Step 18 holds the log in place as feeding surfaces 24 are retreated downwardly. When the feeding surfaces 24 are advanced upwardly in the next cycle, the log will be pushed onto the next stationary pocket by the movable pocket created by the advancing step 26 and the inclined portion 19 of the support surface 14. In this manner, logs are moved in stages between inlet area 21 and outlet area 22 and separated into individual logs. Feeding surface planar sections 28 are formed with large openings 29 that permit bark and other waste material to fall through the apparatus so that it does not interfere with separating operations.

The spacing between log support surfaces 14 and feeding surfaces 24 is selected such that each step 26 projects above inclined portion 19 a distance sufficient to receive a single log in the moving pocket that is formed.

Referring to FIG. 1, log support surfaces 14 are arranged in paired groups with spacing between groups. This spacing permits rollers 12 to be mounted between groups of support surfaces intermediate inlet and outlet areas 21 and 22, respectively, in order to perform the ending function of the present apparatus. Rollers 12 are hour-glass rollers arranged along the longitudinal axis of a log. At least one of the rollers 12 is provided with driving means in the form of a motor 50 driving a belt 52.

As best shown in FIG. 2, rollers 12 are positioned between log support surfaces 14 such that a log being deposited within an upper stationary pocket 20 will also rest on the rollers. Sensing means are provided that detect whenever a log comes to rest atop rollers 12. The sensing means stop hydraulic cylinders 42 moving feeding surfaces 24 and activate motor 50 to rotate at least one of the rollers 12. The rollers cause a supported log to move in a second direction, indicated by arrow 58 in FIG. 1, toward a reference surface 60. Generally, the second direction of log travel for ending purposes will be perpendicular to the first direction of log travel for singulating purposes.

Reference surface 60 is a rigidly mounted surface that stops movement of the log in the second direction thereby establishing a pre-determined position for the log. A further sensor to detect alignment of the log can be used to stop movement of the rollers and resume movement of the singulating device in the first direction so that the aligned log is moved toward outlet area 22.

Once the log has been aligned into a pre-determined position efficient handling and processing of the log is possible with less wastage of material.

The ending apparatus of the present invention can optionally be provided with cutting means positionable with respect to reference surface 60 to cut an aligned log into pre-determined lengths. In the illustrated embodiment, cutting means in the form of circular saw blades 62 are provided. As best shown in FIG. 2, saw blades 62 are mounted above outlet area 22 for pivotable movement about point 66 into and out of the path of logs being transported on the singulating apparatus. The saw blades swing down into the path of the log after the log has been aligned against reference surface 60. The cutting blades are positioned to swing between the log support plates 14.

Although the present invention has been described in some detail by way of example for purposes of clarity and understanding, it will be apparent that certain changes and modifications may be practised within the scope of the appended claims.

I claim:

1. An ending apparatus for positioning elongate objects comprising, in combination:

object singulating means for separating a plurality of elongate objects in an inlet area into single objects while moving the objects in a first direction to an outlet area;

object support means intermediate said inlet and outlet area for supporting a separated, single elongate object adapted to move said elongate object in a second direction toward reference surface means independently of the object's movement in said first direction on said singulating device;

said reference surface means stopping movement of said elongate object to establish a pre-determined position for said elongate object; and cutting means positionable with respect to said reference surface means to cut said object into pre-determined lengths.

2. Apparatus as claimed in claim 1 in which said object support means comprises:

a plurality of rollers to receive an individual elongate object;

drive means to rotate at least one of said rollers to move said elongate object toward said reference surface means in said second direction.

3. Apparatus as claimed in claim 2 in which said rollers are arranged at spaced intervals along a path corresponding to said second direction and the longitudinal axis of one of said elongate objects.

4. Apparatus as claimed in claim 1 in which said first and second directions are perpendicular.

5. Apparatus as claimed in claim 1 in which said cutting means comprises at least one cutting member insertable into the path of said individual elongate object while moving in said first direction to cut said object into pre-determined lengths.

6. Apparatus as claimed in claim 5 in which said cutting member is mounted adjacent said outlet area for pivotable movement into and out of the path of said elongate objects.

7. Apparatus as claimed in claim 5 in which said cutting member comprises a rotary saw blade.

8. Apparatus as claimed in claim 1 in which said reference surface means comprises a fixed surface positioned to abut the end of an elongate object.

9. Apparatus as claimed in claim 1 including first sensing means to determine when an object is positioned on said object support means, said first sensing means stopping movement of said object in said first direction and actuating said object support means to initiate movement of said object in said second direction, and second sensing means to determine when an object has reached said reference surface means, said second sensing means stopping movement of said object in said second direction and resuming movement of said object in said first direction.

10. Apparatus as claimed in claim 1 in which said object singulating means comprises:

spaced and parallel object support surfaces extending between said inlet and outlet areas having a step-like configuration defining a series of stationary object retaining pockets along said support surfaces;

a movable feeding surface between said spaced support surfaces having a corresponding step-like configuration;

drive means to move said feeding surface back and forth between said spaced object support surfaces;

said movable feeding surface being positioned with respect to said object support surfaces such that said step-like configuration of said movable feeding surface moving between said object supporting surfaces define a series of movable pockets that transport objects along said supporting surfaces to said stationary pockets, said movable and stationary pockets being dimensioned to accept only one object at a time such that movement of said objects between pockets by said feeding surface tends to separate groups of objects in said inlet area into single objects for delivery to said outlet area.

11. Apparatus as claimed in claim 10 in which there are a plurality of paired object support surfaces each with an associated feeding surface arranged in spaced, parallel configuration, said object support means being mounted between object support surfaces adjacent a stationary pocket.

12. A method for positioning a plurality of elongate objects comprising the steps of:

moving the objects in a first direction between an inlet area and an outlet area;

separating the elongate objects into discrete objects while moving the objects in said first direction; and aligning each individual elongate object with respect to a pre-determined reference position by movement in a second direction independent of movement in said first direction.

13. A method as claimed in claim 12 including the additional step of:

cutting said positioned objects into one of more pre-determined lengths.

14. A method as claimed in claim 12 in which the step of aligning each individual elongate object involves:

sensing the presence of each individual object;

stopping movement of said object in said first direction;

moving said object in said second direction to stop at a reference surface; and resuming movement of said positioned object in said first direction.

15. A method as claimed in claim 13 in which cutting of said objects comprises the additional steps of:

sensing the presence of said positioned object;

actuating a cutting member to cut through said positioned object while moving in said first direction.

16. A method as claimed in claim 12 in which said separating step is accomplished by a step feeder.

* * * * *

UNITED STATES PATENT AND TRADEMARK OFFICE
CERTIFICATE OF CORRECTION

PATENT NO. : 5,174,351
DATED      : Dec. 29, 1992
INVENTORS  : Bruno Lindenblatt; Gary Larsen It is certified that error appears in the above-identified patent and that said Letters Patent is hereby corrected as shown below:

On the title page, [73], incorrectly identifies the name of the Assignee. The correct name of the Assignee should be --Linden Fabricating and Engineering (Prince George) Ltd., Prince George, Canada--

Signed and Sealed this

Second Day of November, 1993

Attest:

BRUCE LEHMAN

Attesting Officer     Commissioner of Patents and Trademarks